(12) United States Patent
Pan

(10) Patent No.: US 8,442,047 B2
(45) Date of Patent: May 14, 2013

(54) METHOD, SYSTEM, ROUTER AND APPARATUS FOR IMPLEMENTING SWITCHING BETWEEN LAYER-2 MULTICAST ROUTE TRACING AND LAYER-3 MULTICAST ROUTE TRACING

(75) Inventor: Jun Pan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 315 days.

(21) Appl. No.: 12/831,638

(22) Filed: Jul. 7, 2010

(65) Prior Publication Data

US 2010/0272106 A1 Oct. 28, 2010

Related U.S. Application Data

(63) Continuation of application No. PCT/CN2008/073823, filed on Dec. 29, 2008.

(30) Foreign Application Priority Data

Jan. 9, 2008 (CN) .......................... 2008 1 0002701
Jan. 9, 2008 (CN) .......................... 2008 1 0002702

(51) Int. Cl.
*H04L 12/28* (2006.01)
(52) U.S. Cl.
USPC .......................................... 370/390; 370/401
(58) Field of Classification Search ........................ None
See application file for complete search history.

(56) References Cited

U.S. PATENT DOCUMENTS 5,926,463 A * 7/1999 Ahearn et al. ................ 370/254
6,538,997 B1 * 3/2003 Wang et al. ................... 370/241
(Continued)

FOREIGN PATENT DOCUMENTS

CN 1484406 3/2004
CN 1486038 3/2004
(Continued)

OTHER PUBLICATIONS

International Search Report, mailed Apr. 2, 2009, in corresponding International Application No. PCT/CN2008/073823 (6 pp.).

(Continued)

*Primary Examiner* — Phirin Sam
(74) *Attorney, Agent, or Firm* — Staas & Halsey LLP

(57) ABSTRACT

Disclosed herein are a method for implementing switching between layer-2 multicast route tracing and layer-3 multicast route tracing, and a method, a system, a router and an apparatus for differentiating between a layer-2 property and a layer-3 property. One of the methods includes: The query apparatus judges whether to perform layer-2 multicast route tracing, and adds an IP option of layer-2 multicast route tracing into the IGMP Tracert Query packet if layer-2 multicast route tracing needs to be performed. The last-hop router receives the IGMP Tracert Query packet, judges whether the packet carries the IP option of layer-2 multicast route tracing, and transmits the IGMP Tracert Query packet to a downstream layer-2 node transparently if the packet carries the IP option, or initiates layer-3 multicast route tracing if the packet carries no such IP option. The method, system, and router disclosed herein can implement switching between layer-2 multicast route tracing and layer-3 multicast route tracing, and enable the query apparatus to identify the layer property of each IGMP Tracert Response data block.

9 Claims, 3 Drawing Sheets

U.S. PATENT DOCUMENTS

| | | | |
|---|---|---|---|
| 2006/0203819 A1* | 9/2006 | Farinacci et al. | 370/390 |
| 2007/0030817 A1* | 2/2007 | Arunachalam et al. | 370/254 |
| 2007/0047545 A1 | 3/2007 | Bou-Diab et al. | |
| 2007/0058646 A1* | 3/2007 | Hermoni | 370/401 |
| 2007/0253409 A1 | 11/2007 | Fu et al. | |

FOREIGN PATENT DOCUMENTS

| | | |
|---|---|---|
| CN | 1674550 | 9/2005 |
| CN | 101056227 A | 10/2007 |
| CN | 101083629 A | 12/2007 |
| CN | 101483582 B | 2/2012 |

OTHER PUBLICATIONS

Sarac, K. et al., *Tracetree: A Scalable Mechanism to Discover Multicast Tree Topologies in the Internet*, IEEE/ACM Transactions on Networking, vol. 12, No. 5, Oct. 2004, pp. 795-808.

A *"Traceroute" Facility for IP Multicast*, draft-fenner-traceroute-ipm-01, pp. 1-18.

Malkin, G., *Traceroute Using an IP Option, Network Working Group*, rfc1393, Jan. 1993, pp. 1-7.

Sajassi, A. et al., *Fault Management for Virtual Private LAN Services*, Layer-2 VPN Working Group, Mar. 2004, pp. 1-14.

Asaeda, H. et al., *Mtrace Version 2: Traceroute Facility for IP Multicast*, MBONED Working Group, Jul. 2, 2007, pp. 1-36.

Viswanathan, A. et al., Traceflow, Force10 Networks, Aug. 16, 2008, pp. 1-38.

Extended European Search Report, mailed Dec. 1, 2010, in corresponding European Application No. 08871136.1 (9 pp.).

Notification of Patent Allowance for Patent Application mailed Nov. 28, 2011 in corresponding Chinese Patent Application No. 200810002701.3 (2 pages) (2 pages English translation, verification of translation statement).

First Chinese Office Action issued May 25, 2011 in corresponding Chinese Patent Application No. 200810002701.3 (3 pages) (2 pages English translation, verification of translation statement).

Granted/Patentable claims published Feb. 1, 2012 in corresponding Chinese Patent Application No. 200810002701.3 (12 pages) (3 pages English translation, verification of translation statement).

* cited by examiner

US 8,442,047 B2

METHOD, SYSTEM, ROUTER AND APPARATUS FOR IMPLEMENTING SWITCHING BETWEEN LAYER-2 MULTICAST ROUTE TRACING AND LAYER-3 MULTICAST ROUTE TRACING

CROSS-REFERENCE TO RELATED APPLICATIONS

This application is a continuation of International Application No. PCT/CN2008/073823, filed on Dec. 29, 2008, which claims priority to Chinese Patent Application No. 200810002701.3, filed on Jan. 9, 2008 and Chinese Patent Application No. 200810002702.8, filed on Jan. 9, 2008, all of which are hereby incorporated by reference in their entireties.

FIELD OF THE INVENTION

The present invention relates to the multicast field, and in particular, to a method for implementing switching between layer-2 multicast route tracing and layer-3 multicast route tracing, a system and a router for implementing switching between layer-2 multicast route tracing and layer-3 multicast route tracing, a method for differentiating between a layer-2 property and a layer-3 property, and a system for differentiating between a layer-2 property and a layer-3 property and a query apparatus.

BACKGROUND

Multicast route tracing refers to tracing the complete multicast forwarding route from a multicast data receiver to a multicast source. The existing Multicast Trace Route (Mtracert) is a troubleshooting tool of the multicast routing protocol. This tool implements tracing of the layer-3 multicast route.

Layer-3 multicast route tracing refers to tracing from the last-hop router of the direct connection multicast member to the first-hop router of the direct multicast source and obtaining a leaf-to-root route of the multicast tree. FIG. 1 shows a multicast structure in the prior art. The solid arrow in FIG. 1 indicates the data flow direction of implementing layer-3 multicast route tracing through an Mtracert.

Query apparatus A in FIG. 1 is a router or network management host on which an Mtracert tool is installed. The network administrator inputs a multicast trace command (mtrace) on the query apparatus A. The command is an instruction of tracing the multicast route from the multicast data receiver PC4 to the multicast source server 1, and the command includes an IP address S (namely, source address) of server 1, an IP address D1 (namely, destination address) of server PC4, and the address G1 of the multicast group that includes PC4. According to this command, the query apparatus A sends an Internet user Group Management Protocol (IGMP) Tracert Query packet to a last-hop router R5 directed to the destination address. FIG. 2 shows a structure of an IGMP Tracert Query packet in the prior art. The IGMP Tracert Query packet in FIG. 2 includes: a header of an IP packet composed of 20 bytes, an IP option, and a content part composed of 24 bytes. There may be zero or many IP options.

After receiving the IGMP Tracert Query packet, the router R5 initiates layer-3 multicast route tracing. The specific operation process is: The R5 sends an IGMP Tracert Request packet to a router R4 of the previous hop along an inverse multicast route directed to the source address. This packet is formed by modifying the IGMP Type field in the content part of the IGMP Tracert Query packet, and adding IGMP Tracert Response data of this node after the modified IGMP Tracert Query packet, in which the IGMP Tracert Response data carries information about the router R5. FIG. 3 shows a structure of IGMP Tracert Response data in the prior art.

After receiving the IGMP Tracert Request packet sent by R5, R4 adds IGMP Tracert Response data inclusive of R4 information after the packet to form a new IGMP Tracert Request packet, and sends the packet to R2. On the basis of analogy, after receiving the IGMP Tracert Request packet, the first-hop router R1 connected to the multicast source (server 1) sends an IGMP Tracert Response packet to query apparatus A. The IGMP Tracert Response packet is formed by modifying the IGMP Type field in the content part of the IGMP Tracert Request packet, and adding the IGMP Tracert Response data of this node into the modified IGMP Tracert Request packet. The IGMP Tracert Response packet includes the IGMP Tracert Response data added by each router in the transmission process of the IGMP Tracert Request packet. According to the IGMP Tracert Response packet, query apparatus A knows the multicast traffic from the last-hop R5 to the first-hop R1.

In the process of developing the present invention, the inventor finds that: In the multicast route tracing process above, after receiving the IGMP Tracert Query packet, the last-hop router sends an IGMP Tracert Request packet to the node of the previous hop to initiate layer-3 multicast route tracing; after receiving the IGMP Tracert Request packet, the first-hop router returns a layer-3 multicast route tracing response by sending an IGMP Tracert Response packet to the response address (such as query apparatus A) specified in the IGMP Tracert Request. This process implements only layer-3 multicast route tracing, and cannot implement layer-2 multicast route tracing.

SUMMARY

The embodiments of the present invention provide two methods for implementing switching between layer-2 multicast route tracing and layer-3 multicast route tracing, and a method, a system, a router, and an apparatus for differentiating between a layer-2 property and a layer-3 property, with a view to switching between layer-2 multicast route tracing and layer-3 multicast route tracing.

A method for implementing switching between layer-2 multicast route tracing and layer-3 multicast route tracing includes:

receiving an IGMP Tracert Query packet sent by a query apparatus, where the packet carries an IP option of layer-2 multicast route tracing if the query apparatus determines that the layer-2 multicast route tracing needs to be implemented; and judging whether the packet carries the IP option of layer-2 multicast route tracing;

transmitting the IGMP Tracert Query packet to a downstream layer-2 node transparently if the packet carries the IP option, or initiating layer-3 multicast route tracing if the packet carries no such IP option.

Another method for implementing switching between layer-2 multicast route tracing and layer-3 multicast route tracing includes:

receiving an IGMP Tracert Request packet turned from an IGMP Tracert Query packet; and judging whether the IGMP Tracert Request packet carries an IP option of layer-2 multicast route tracing; if the IGMP Tracert Request packet carries the IP option, adding IGMP Tracert Response data of this node into the IGMP Tracert Request packet, regenerating an IGMP Tracert Request packet, and sending the regenerated IGMP Tracert Request packet to an upstream layer-2 node; if the IGMP Tracert Request packet carries no such IP option, returning a layer-3 multicast route tracing response.

The IP option of layer-2 multicast route tracing are a layer-2 multicast route tracing IP option carried in the IGMP Tracert Query packet after the query apparatus determines that the layer-2 multicast route tracing needs to be implemented.

A system for implementing switching between layer-2 multicast route tracing and layer-3 multicast route tracing includes:

a query apparatus, configured to add an IP option of layer-2 multicast route tracing into an IGMP Tracert Query packet when the layer-2 multicast route tracing needs to be implemented; and a last-hop router, configured to: receive the IGMP Tracert Query packet; judge whether the packet carries the IP option of layer-2 multicast route tracing; and transmit the IGMP Tracert Query packet to a downstream layer-2 node transparently if the packet carries the IP option, or initiate layer-3 multicast route tracing if the packet carries no such IP option.

A router includes:

a receiving module, configured to receive an IGMP Tracert Query packet;

a judging module, configured to judge whether the IGMP Tracert Query packet received by the receiving module carries IP option of layer-2 multicast route tracing;

a transparent transmission module, configured to transmit the IGMP Tracert Query packet to a downstream layer-2 node transparently if the judging module determines that the IGMP Tracert Query packet carries the IP option; and an initiating module, configured to initiate layer-3 multicast route tracing if the judging module determines that the IGMP Tracert Query packet carries no such IP option.

A system for implementing switching between layer-2 multicast route tracing and layer-3 multicast route tracing includes:

a query apparatus, configured to add an IP option of layer-2 multicast route tracing into an IGMP Tracert Query packet when the layer-2 multicast route tracing needs to be implemented;

a first-hop router, configured to: receive an IGMP Tracert Request packet turned form the IGMP Tracert Query packet; and judge whether the IGMP Tracert Request packet carries an IP option of layer-2 multicast route tracing; if the IGMP Tracert Request packet carries the IP option, add IGMP Tracert Response data of this node into the IGMP Tracert Request packet, regenerate an IGMP Tracert Request packet, and send the regenerated IGMP Tracert Request packet to an upstream layer-2 node; if the IGMP Tracert Request packet carries no such IP option, return a layer-3 multicast route tracing response.

A router includes:

a receiving module, configured to receive an IGMP Tracert Request packet;

a judging module, configured to judge whether the IGMP Tracert Request packet received by the receiving module carries an IP option of layer-2 multicast route tracing;

a transparent transmission module, configured to: add IGMP Tracert Response data of this node into the IGMP Tracert Request packet, regenerate an IGMP Tracert Request packet, and send the regenerated IGMP Tracert Request packet to an upstream layer-2 node if the judging module determines that the IGMP Tracert Request packet carries the IP option; and a returning module, configured to return a layer-3 multicast route tracing response if the judging module determines that the IGMP Tracert Request packet carries no such IP option.

A method for differentiating between a layer-2 property and a layer-3 property includes:

by a query apparatus, receiving an IGMP Tracert Response packet turned from an IGMP Tracert Request packet, and judging whether a layer property of IGMP Tracert Response data carried in the IGMP Tracert Response packet is layer 2 or layer 3 according to layer-2 property information or layer-3 property information carried in the IGMP Tracert Response data, where the layer-2 property information or layer-3 property information is added by a layer-2 device or layer-3 device that receives or sends the IGMP Tracert Request packet into the IGMP Tracert Response data.

A system for differentiating between a layer-2 property and a layer-3 property includes:

a layer-2 device, configured to add layer-2 property information into IGMP Tracert Response data and generate an IGMP Tracert Request packet;

a layer-3 device, configured to add layer-3 property information into IGMP Tracert Response data and generate an IGMP Tracert Request packet; and a query apparatus, configured to: receive an IGMP Tracert Response packet turned from an IGMP Tracert Request packet, and judge whether a layer property of the IGMP Tracert Response data carried in the IGMP Tracert Response packet is layer 2 or layer 3 according to the layer-2 property information or the layer-3 property information carried in the IGMP Tracert Response data.

A query apparatus is configured to: receive an IGMP Tracert Response packet, and determine that a layer property of IGMP Tracert Response data carried in an IGMP Tracert Response packet is layer 2 according to layer-2 property information carried in the IGMP Tracert Response data, or determine that the layer property of the IGMP Tracert Response data carried in the IGMP Tracert Response packet is layer 3 according to layer-3 property information carried in the IGMP Tracert Response data.

Through the method, system, and router for implementing switching between layer-2 multicast route tracing and layer-3 multicast route tracing herein, an IP option of layer-2 multicast route tracing are added or not added into a multicast IGMP Tracert Query packet, depending on the selection made by the user; after receiving a packet in the multicast route tracing process, the last-hop router or the first-hop router can decide whether to implement layer-2 multicast route tracing by judging whether the packet carries an IP option of layer-2 multicast route tracing, thus implementing switching between layer-2 multicast route tracing and layer-3 multicast route tracing.

DETAILED DESCRIPTION OF THE EMBODIMENTS

The embodiments of the present invention provide a method for implementing switching between layer-2 multicast route tracing and layer-3 multicast route tracing. Through this method, after receiving an IGMP Tracert Query, the last-hop router decides whether to transmit the IGMP Tracert Query packet transparently or initiate layer-3 multicast route tracing by judging whether the IGMP Tracert Query packet carries information indicative of layer-2 multicast route tracing; or, after receiving an IGMP Tracert Request packet, the first-hop router decides whether to send the IGMP Tracert Request packet to the upper-layer node or return a layer-3 multicast route tracing response by judging whether the IGMP Tracert Request packet carries information indicative of layer-2 multicast route tracing switching.

Figure 1:
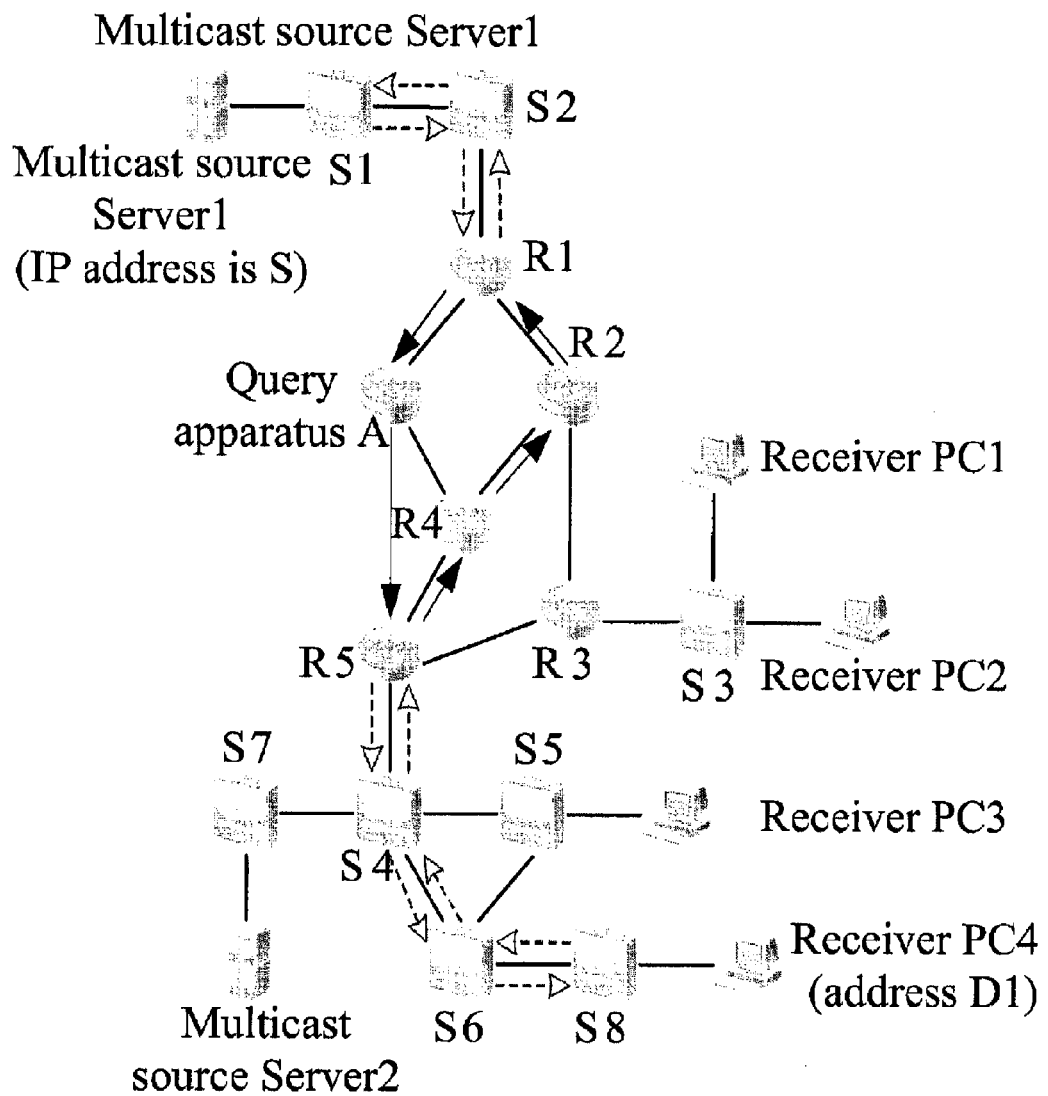
FIG. 1 shows a multicast structure in the prior art.
Figure 2:
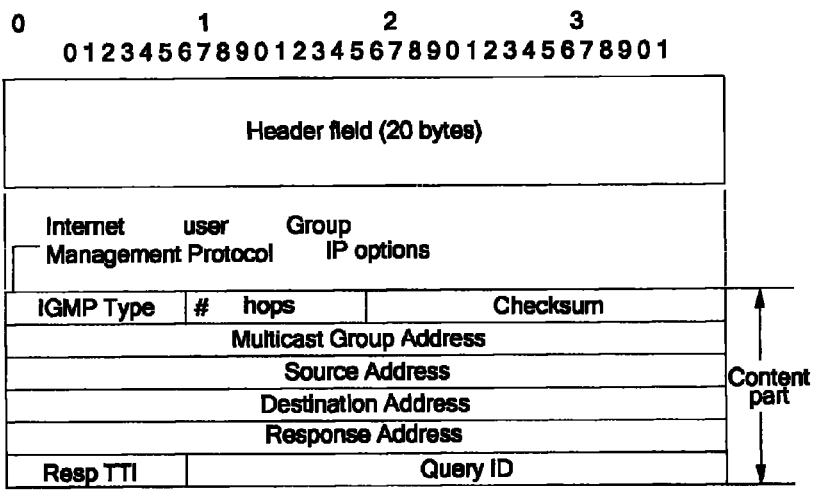
FIG. 2 shows a structure of a IGMP Tracert Query packet in the prior art.
Figure 3:
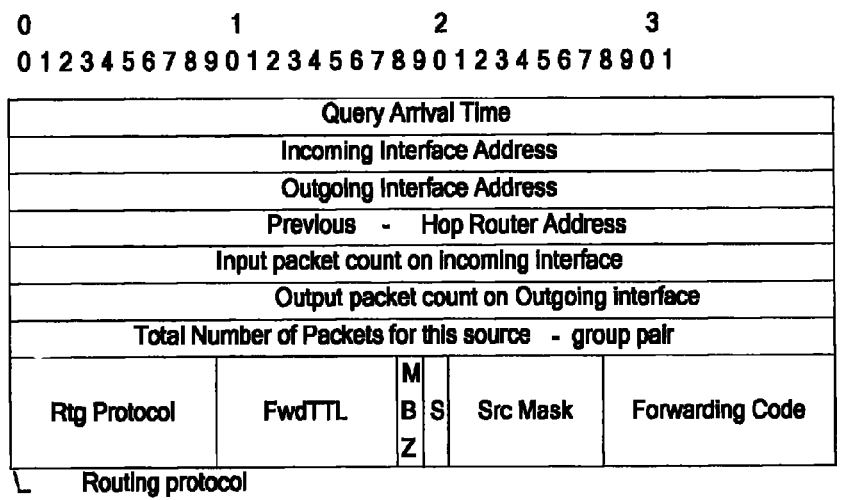
FIG. 3 shows a structure of IGMP Tracert Response data in the prior art.
Figure 4:
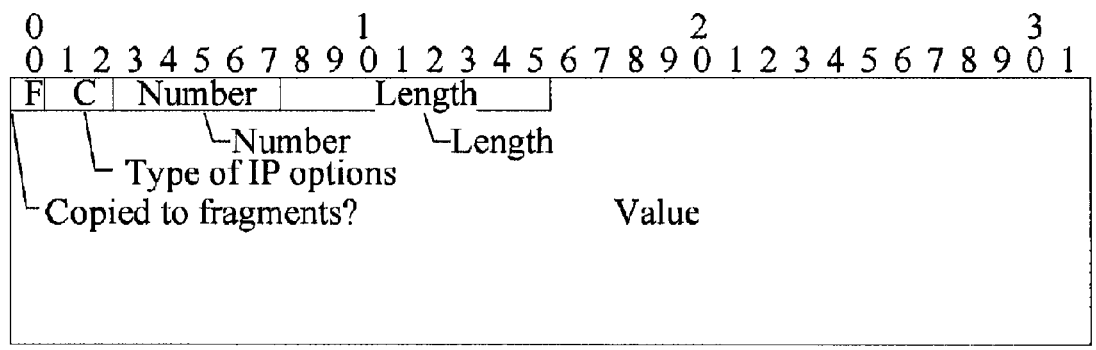
FIG. 4 shows a structure of an IP Traceroute option in the prior art.

An IP option of layer-2 multicast route tracing is defined in an embodiment of the present invention to implement switching between layer-2 multicast route tracing and layer-3 multicast route tracing. The existing IP Traceroute (IP multicast route tracing) option in the prior art may be reused as the IP option of layer-2 multicast route tracing, and the length of this IP Traceroute option is 12 bytes. FIG. 4 shows a structure of an IP Traceroute option in the prior art. The IP Traceroute option in FIG. 4 includes:

an F field (indicating whether to copy to a fragment): if the value of this field is 0, it indicates no need of copying to the fragment;

a C field (indicating type of the IP option); if the value of this field is 2, it indicates "debugging & measurement");

a Number field (indicating the serial number of the IP option)=18;

a Length field (indicating length of the IP option, measured in bytes)=12; and a Value field (indicating the value carried in the IP option).

Figure 5:
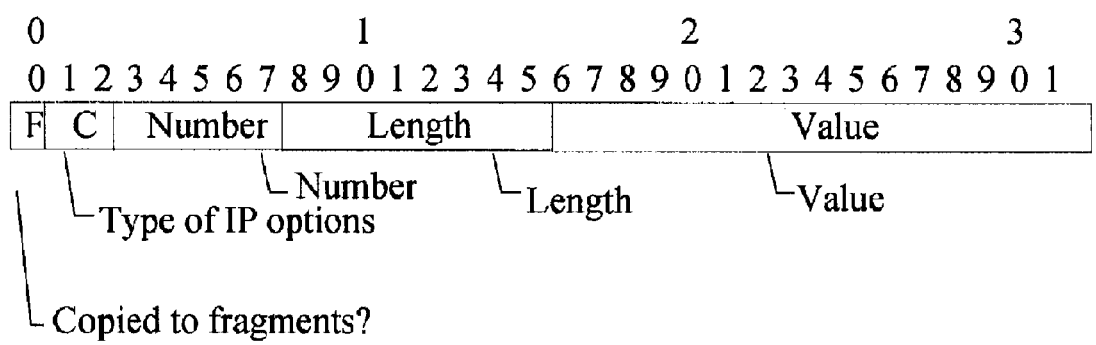
FIG. 5 shows a structure of an IP option of layer-2 multicast route tracing in an embodiment of the present invention.

The IP Traceroute option in the prior art may be reused as the IP option of layer-2 multicast route tracing defined in an embodiment of the present invention. The length of the IP option of layer-2 multicast route tracing may be defined as 4 bytes. FIG. 5 shows a structure of an IP option of layer-2 multicast route tracing in an embodiment of the present invention. The IP option of layer-2 multicast route tracing includes:

an F field (indicating whether to copy to a fragment): if the value of this field is 0, it indicates no need of copying to the fragment;

a C field (indicating type of the IP option): if the value of this field is 2, it indicates "debugging & measurement");

a Number field (indicating the serial number of the IP option)=18;

a Length field (indicating length of the IP option, measured in bytes)=4; and a Value field (indicating the value carried in this IP option): if the value of this field is 0, it indicates that layer-2 multicast route tracing needs to be implemented.

The Number field in the IP option of layer-2 multicast route tracing defined in this embodiment is the same as the Number field in the existing IP Traceroute option in the prior art.

In embodiments of the present invention, the IP option of layer-2 multicast route tracing is not limited to the existing IP Traceroute option in the prior art, and other IP options in the prior art may be reused as the IP option of layer-2 multicast route tracing, or a new IP option may be defined as the IP option of layer-2 multicast route tracing. The embodiments of the present invention do not limit the length or value of the IP option of layer-2 multicast route tracing. Any structure of an IP option of layer-2 multicast route tracing is appropriate only if the last-hop switch or the first-hop switch performs the corresponding operations in order to realize switching between layer-2 multicast route tracing and layer-3 multicast route tracing after the last-hop switch or the first-hop switch receives a packet that carries the IP option of layer-2 multicast route tracing. It is understandable to those skilled in the art that the IP option of layer-2 multicast route tracing may be in other structures.

In the prior art, the user inputs a mtrace command on the query apparatus, and the query apparatus generates an IGMP Tracert Query packet which is an instruction of tracing the multicast route. The embodiments of the present invention can use the IGMP Tracert Query packet. If expecting to trace the layer-2 multicast route, the user adds the IP option of layer-2 multicast route tracing into the IGMP Tracert Query packet. That is, the query apparatus judges whether to perform layer-2 multicast route tracing, and adds an IP option of layer-2 multicast route tracing into the IGMP Tracert Query packet if layer-2 multicast route tracing needs to be performed.

After the IGMP Tracert Query packet is transmitted to the last-hop router, the last-hop router receives the packet, judges whether the packet carries the IP option of layer-2 multicast route tracing, and transmits the IGMP Tracert Query packet to a downstream layer-2 node transparently if the packet carries the IP option, or initiates layer-3 multicast route tracing if the packet carries no such IP option. The layer-3 multicast route tracing is initiated by sending an IGMP Tracert Request packet to the upstream node.

Alternatively, after the IGMP Tracert Request packet turned from the IGMP Tracert Query packet is transmitted to the first-hop router, the first-hop router receives the IGMP Tracert Request packet, and judges whether the IGMP Tracert Request packet carries an IP option of layer-2 multicast route tracing; if the IGMP Tracert Request packet carries the IP option, the first-hop router regenerates an IGMP Tracert Request packet, and sends the regenerated IGMP Tracert Request packet to an upstream layer-2 node; if the IGMP Tracert Request packet carries no such IP option, the first-hop router returns a layer-3 multicast route tracing response. The layer-3 multicast route tracing response is returned by sending an IGMP Tracert Response packet to the response address (which is generally query apparatus A) specified in the IGMP Tracert Request.

In this way, after generating an IGMP Tracert Query packet, the query apparatus judges whether to perform layer-2 multicast route tracing, and adds an IP option of layer-2 multicast route tracing into the IGMP Tracert Query packet if layer-2 multicast route tracing needs to be performed. After receiving the packet, the last-hop router or the first-hop router can implement switching between layer-2 multicast route tracing and layer-3 multicast route tracing depending on whether the packet carries an IP option of layer-2 multicast route tracing.

A system for implementing switching between layer-2 multicast route tracing and layer-3 multicast route tracing in an embodiment of the present invention includes:

a query apparatus, configured to: judge whether to perform layer-2 multicast route tracing, and add an IP option of layer-2 multicast route tracing into the IGMP Tracert Query packet if layer-2 multicast route tracing needs to be performed; and a last-hop router, configured to: receive the IGMP Tracert Query packet, judge whether the packet carries the IP option of layer-2 multicast route tracing, and transmit the IGMP Tracert Query packet to a downstream layer-2 node transparently if the packet carries the IP option, or initiate layer-3 multicast route tracing if the packet carries no such IP option.

A router provided in an embodiment of the present invention includes:

a receiving module, configured to receive an IGMP Tracert Query packet;

a judging module, configured to judge whether the IGMP Tracert Query packet received by the receiving module carries IP option of layer-2 multicast route tracing;

a transparent transmission module, configured to transmit the IGMP Tracert Query packet to a downstream layer-2 node transparently if the judging module determines that the IGMP Tracert Query packet carries the IP option; and an initiating module, configured to initiate layer-3 multicast route tracing if the judging module determines that the IGMP Tracert Query packet carries no such IP option.

Another system for implementing switching between layer-2 multicast route tracing and layer-3 multicast route tracing in an embodiment of the present invention includes:

a query apparatus, configured to: judge whether to perform layer-2 multicast route tracing, and add an IP option of layer-2 multicast route tracing into the IGMP Tracert Query packet if layer-2 multicast route tracing needs to be performed; and a first-hop router, configured to: receive an IGMP Tracert Request packet turned from the IGMP Tracert Query packet, and judge whether the IGMP Tracert Request packet carries an IP option of layer-2 multicast route tracing; if the IGMP Tracert Request packet carries the IP option, add IGMP Tracert Response data of this node into the IGMP Tracert Request packet, regenerate an IGMP Tracert Request packet, and send the regenerated IGMP Tracert Request packet to an upstream layer-2 node; if the IGMP Tracert Request packet carries no such IP option, return a layer-3 multicast route tracing response.

Another router provided in an embodiment of the present invention includes:

a receiving module, configured to receive an IGMP Tracert Request packet;

a judging module, configured to judge whether the IGMP Tracert Request packet received by the receiving module carries an IP option of layer-2 multicast route tracing;

a transparent transmission module, configured to: add IGMP Tracert Response data of this node into the IGMP Tracert Request packet, regenerate an IGMP Tracert Request packet, and send the regenerated IGMP Tracert Request packet to an upstream layer-2 node if the judging module determines that the IGMP Tracert Request packet carries the IP option; and a returning module, configured to return a layer-3 multicast route tracing response if the judging module determines that the IGMP Tracert Request packet carries no such IP option.

Therefore, the method, system, and apparatus disclosed herein define an IP option of layer-2 multicast route tracing, the last-hop router or the first-hop router judges whether the received packet carries the IP option of layer-2 multicast route tracing to implement switching between layer-2 multicast tracing and layer-3 multicast tracing.

When layer-2 multicast route tracing occurs, the switch in the multicast route may add the IGMP Tracert Response data that carries information about this switch into the IGMP Tracert Request packet. In order to facilitate the query apparatus to identify the layer property of each IGMP Tracert Response data block in the received IGMP Tracert Response packet, the present invention discloses a method for differentiating between a layer-2 property and a layer-3 property. Through this method, after receiving an IGMP Tracert Response packet, the query apparatus identifies the layer property of each IGMP Tracert Response data block according to the layer property information carried in each IGMP Tracert Response data block in the IGMP Tracert Response packet.

In an embodiment of the present invention, through an Rtg Protocol (routing protocol) field of IGMP Tracert Response data, the layer-2 property information of layer-2 device is added into the corresponding IGMP Tracert Response data. After receiving the IGMP Tracert Response packet, the query apparatus can determine that the layer property of the corresponding IGMP Tracert Response data is layer 2 according to the layer-2 property information.

In the prior art, the Rtg Protocol field in the IGMP Tracert Response data indicates a layer-3 multicast protocol. Table 1 shows meanings of values of the Rtg Protocol field in the prior art.

TABLE 1

| 1 | DVMRP (Distance Vector Multicast Routing Protocol) |
| 2 | MOSPF (Multicast Open Shortest Path First) |
| 3 | PIM (Protocol Independent Multicast) |
| 4 | CBT (Core Based Trees) |
| 5 | PIM using special routing table |
| 6 | PIM using a static route |
| 7 | DVMRP using a static route |
| 8 | PIM using MBGP (aka BGP4+) route |
| 9 | CBT using special routing table |
| 10 | CBT using a static route |
| 11 | PIM using state created by Assert processing |

The detailed method of differentiating between a layer-2 property and a layer-3 property in an embodiment of the present invention is:

Layer-2 property information or layer-3 property information is added into IGMP Tracert Response data and an IGMP Tracert Request packet is generated; and a query apparatus receives an IGMP Tracert Response packet turned from an IGMP Tracert Request packet, and judges whether a layer property of the IGMP Tracert Response data carried in the IGMP Tracert Response packet is layer 2 or layer 3 according to the layer-2 property information or the layer-3 property information carried in the IGMP Tracert Response data.

In the foregoing method, the layer-2 device may be a switch and the layer-3 device may be a router.

The layer-2 property information may be carried in an Rtg Protocol field of the IGMP Tracert Response data. As shown in Table 1, the values from 1 to 11 of the Rtg Protocol field are already occupied in the prior art, and the remaining values are reserved. Therefore, a reserved value of the Rtg Protocol field may be used to indicate the layer-2 multicast protocol type. Table 2 shows values of the layer-2 multicast protocol type in the Rtg Protocol field in this embodiment.

TABLE 2

| 12 | IGMP Snooping |
| 13 | GMRP |

The Rtg Protocol field whose values range from 1 to 11 above carries layer-3 property information, and the Rtg Protocol field whose value is 12 and 13 above carries layer-2 property information. After receiving an IGMP Tracert Response packet, the query apparatus checks the Rtg Protocol field of each IGMP Tracert Response data block in the packet. If the value of the field falls within 1-11, the query apparatus determines that the layer property of the IGMP Tracert Response data is layer 3; if the value of the field is 12 or 13, the query apparatus determines that the layer property of the IGMP Tracert Response data is layer 2. The embodiments of the present invention do not limit the protocol type represented by different values in the Rtg Protocol field, but require that different values represent different protocol types to make the layer property identifiable to the query apparatus.

In other embodiments of the present invention, the information in the Rtg Protocol field may be divided into two parts. The first X bits are defined as a Protocol Layer Code (PLC), and the last (8-X) bits are defined as Protocol Code (PC). Meanwhile, layer-2 property information or layer-3 property information is divided into two parts: protocol layer property information and protocol name information. The PLC carries protocol-layer property information, and the PC carries protocol name information.

Figure 6:
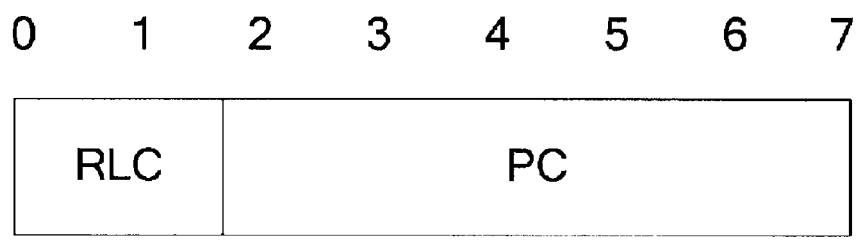
FIG. 6 shows a structure of an Rtg Protocol field defined in an embodiment of the present invention.

The following detailed description supposes that the value of X is 2. FIG. 6 shows a structure of an Rtg Protocol field defined in an embodiment of the present invention. The first 2 bits is a PLC, and the last 6 bits are a PC.

Table 3 is a list of exemplary values of an Rtg Protocol field defined in an embodiment of the present invention.

TABLE 3

| Layer | PLC value | PC value | Rtg Protocol value | Protocol type |
|---|---|---|---|---|
| Layer 3 | 0 | 1 | 1 | DVMRP |
| | 0 | 2 | 2 | MOSPF |
| | 0 | 3 | 3 | PIM |
| | 0 | 4 | 4 | CBT |
| | 0 | 5 | 5 | PIM using special route table |
| | 0 | 6 | 6 | PIM using a static route |
| | 0 | 7 | 7 | DVMRP using a static route |
| | 0 | 8 | 8 | PIM using MBGP (aka BGP4+) route |
| | 0 | 9 | 9 | CBT using special routing table |
| | 0 | 10 | 10 | CBT using a static route |
| | 0 | 11 | 11 | PIM using state created by Assert processing |
| Layer 2 | 1 | 1 | 65 (binary: 01000001) | IGMP Snooping |
| | 1 | 2 | 66 (binary: 01000010) | GMRP |

The Rtg Protocol field whose values range from 1 to 11 above carries layer-3 property information, and the Rtg Protocol field whose value is 65 and 66 above carries layer-2 property information. After receiving an IGMP Tracert Response packet, the query apparatus checks the Rtg Protocol field of each IGMP Tracert Response data block in the packet. If the value of the field falls within 1-11, the query apparatus determines that the layer property of the IGMP Tracert Response data is layer 3; if the value of the field is 65 or 66, the query apparatus determines that the layer property of the IGMP Tracert Response data is layer 2. An easier method is to check the PLC in the Rtg Protocol field. If the PLC value is 0, the layer property of the IGMP Tracert Response data is layer 3; and, if the PLC value is 1, the layer property of the IGMP Tracert Response data is layer 2. Table 3 above is only an example. Other values may be used to represent the layer property information only if they can identify different the layer property information.

In conclusion, layer property information is added into the IGMP Tracert Response data so that the query apparatus can determine the layer property of each IGMP Tracert Response data block according to the layer property information.

A system for differentiating between a layer-2 property and a layer-3 property in an embodiment of the present invention includes:

a layer-2 device, configured to add layer-2 property information into IGMP Tracert Response data and generate an IGMP Tracert Request packet;

a layer-3 device, configured to add layer-3 property information into IGMP Tracert Response data and generate an IGMP Tracert Request packet; and a query apparatus, configured to: receive an IGMP Tracert Response packet turned from an IGMP Tracert Request packet, and judge whether a layer property of the IGMP Tracert Response data carried in the IGMP Tracert Response packet is layer 2 or layer 3 according to the layer-2 property information or the layer-3 property information carried in the IGMP Tracert Response data.

A query apparatus provided in an embodiment of the present invention is configured to: receive an IGMP Tracert Response packet, and determine that a layer property of IGMP Tracert Response data carried in an IGMP Tracert Response packet is layer 2 according to layer-2 property information carried in the IGMP Tracert Response data, or determine that the layer property of the IGMP Tracert Response data carried in the IGMP Tracert Response packet is layer 3 according to layer-3 property information carried in the IGMP Tracert Response data.

Through the method, system, and apparatus disclosed herein, layer-2 property information or layer-3 property information is added into the IGMP Tracert Response data when the layer-2 device or the layer-3 device generates an IGMP Tracert Request packet, and therefore, the query apparatus can identify the layer property of each IGMP Tracert Response data block after receiving the IGMP Tracert Response packet.

After reading the foregoing embodiments, those skilled in the art are clearly aware that the embodiments of the present invention may be implemented through hardware, or, preferably, through software in addition to a necessary universal hardware platform in most circumstances. Therefore, the contributions made by the technical solution under the present invention as against the prior art may be partially or completely embodied as a software product. The software product may be stored in a storage medium such as ROM/RAM, magnetic disk, or CD-ROM, and incorporates several instructions for instructing a computer device (for example, personal computer, server, or network device) to execute the method specified in each embodiment of the present invention or a part of the embodiment.

Although the invention has been described through several preferred embodiments, the invention is not limited to such embodiments. Any modification, equivalent replacement, or improvement made without departing from the spirit and principle of the present invention should fall within the scope of the present invention.

What is claimed is:

1. A method for implementing switching between layer-2 multicast route tracing and layer-3 multicast route tracing, comprising:

judging, by a query apparatus, whether to perform layer-2 multicast route tracing;

adding, by the query apparatus, an IP option of layer-2 multicast route tracing into IGMP Tracert Query packet if layer-2 multicast route tracing needs to be performed;

receiving, by a last-hop router, the IGMP Tracert Query packet;

judging, by the last-hop router, whether the IGMP Tracert Query packet carries the IP option of layer-2 multicast route tracing;

transmitting, by the last-hop router, the IGMP Tracert Query packet to a downstream layer-2 transparently if the packet carries the IP option; or sending an IGMP Tracert Requet packet to the upstream node if the IGMP Tracert Query packet carries no such IP option.

2. The method of claim 1, wherein:
a Number field of the IP option of the layer-2 multicast route tracing is the same as a Number field of an IP multicast Traceroute option.

3. The method of claim 1, further comprising:
adding, by each layer-2 device or each layer-3 device that receives or sends an IGMP Tracert Request packet turned from the IGMP Tracert Query packet, a layer-2 property information or layer-3 property information into an IGMP Tracert Response data, wherein the layer-2 property information or layer-3 property information enables the query apparatus to determine whether a layer property of the IGMP Tracert Response data block carried in a received IGMP Tracert Response packet is layer 2 or layer 3, and the IGMP Tracert Response packet is turned from the IGMP Tracert Request packet.

4. The method of claim 3, wherein:
the layer-2 property information is added by the layer-2 device into an Rtg Protocol field in the IGMP Tracert Response data; and
the layer-3 property information is added by the layer-3 device into an Rtg Protocol field in the IGMP Tracert Response data.

5. The method of claim 3, wherein:
the layer-2 property information or layer-3 property information carries protocol layer property information and property name information; and
the Rtg Protocol field carries a Protocol Layer Code (PLC) and a Protocol Code (PC), wherein the PLC carries the protocol layer property information and the PC carries the protocol name information.

6. A system for implementing switching between layer-2 multicast route tracing and layer-3 multicast route tracing, comprising:
a query apparatus, configured to judge whether to perform layer-2 multicast route tracing, and add an Internet Protocol (IP) option of the layer-2 multicast route tracing into an Internet user Group Management Protocol (IGMP) Tracert Query packet if the layer-2 multicast route tracing needs to be implemented; and
a last-hop router, configured to: receive the IGMP Tracert Query packet; judge whether the packet carries the IP option of the layer-2 multicast route tracing; and transmit the IGMP Tracert Query packet to a downstream layer-2 node transparently if the packet carries the IP option, or sending an IGMP Tracert Requet packet to the upstream node if the IGMP Tracert Requet packet carries no such IP option.

7. A system of claim 6, further comprising:
a first-hop router, configured to: receive an IGMP Tracert Request packet turned from the IGMP Tracert Query packet; and judge whether the IGMP Tracert Request packet carries the IP option of the layer-2 multicast route tracing; if the IGMP Tracert Request packet carries the IP option, add IGMP Tracert Response data of this node into the IGMP Tracert Request packet, regenerate an IGMP Tracert Request packet, and send the regenerated IGMP Tracert Request packet to an upstream layer-2 node; if the IGMP Tracert Request packet carries no such IP option, return a layer-3 multicast route tracing response.

8. A system of claim 6:
the query apparatus, further configured to: receive an IGMP Tracert Response packet turned from the IGMP Tracert Request packet, and judge whether a layer property of the IGMP Tracert Response data carried in the IGMP Tracert Response packet is layer 2 or layer 3 according to the layer-2 property information or the layer-3 property information carried in the IGMP Tracert Response data, the system further comprising:
a layer-2 device, configured to add layer-2 property information into Internet user Group Management Protocol (IGMP) Tracert Response data and generate an IGMP Tracert Request packet;
a layer-3 device, configured to add layer-3 property information into the IGMP Tracert Response data and generate an IGMP Tracert Request packet.

9. A router, comprising:
a receiving module, configured to receive an IGMP Tracert Query packet;
a judging module, configured to judge whether the IGMP Tracert Query packet received by the receiving module carries IP option of layer-2 multicast route tracing;
a transparent transmission module, configured to transmit the IGMP Tracert Query packet to a downstream layer-2 node transparently if the judging module determines that the IGMP Tracert Query packet carries the IP option; and
an initiating module, configured to sending an IGMP Tracert Query packet if the judging module determines that the IGMP Tracert Query packet carries no such IP option.

* * * * *